(12) United States Patent
Acquarulo, Jr. et al.

(10) Patent No.: US 7,034,071 B2
(45) Date of Patent: *Apr. 25, 2006

(54) OPTIMIZING NANO-FILLER PERFORMANCE IN POLYMERS

(75) Inventors: Lawrence A. Acquarulo, Jr., Lisbon, CT (US); Charles O'Neil, Chelmsford, MA (US); Jianwei Xu, Dayville, CT (US)

(73) Assignee: Foster Corporation, Putnam, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/894,778

(22) Filed: Jul. 20, 2004

(65) Prior Publication Data

US 2004/0259969 A1 Dec. 23, 2004

Related U.S. Application Data

(63) Continuation of application No. 10/129,921, filed as application No. PCT/US00/31174 on Nov. 13, 2000, now Pat. No. 6,833,392.

(60) Provisional application No. 60/164,589, filed on Nov. 10, 1999.

(51) Int. Cl.
| | |
|---|---|
| *A61M 25/00* | (2006.01) |
| *A61M 25/10* | (2006.01) |
| *C08J 3/24* | (2006.01) |
| *C08K 3/20* | (2006.01) |

(52) U.S. Cl. ............... 524/445; 524/447; 523/105; 604/96.01; 604/264; 604/540; 604/103.01

(58) Field of Classification Search ............... 522/79, 522/137, 74; 523/205, 209; 428/403, 407, 428/402; 524/445, 447; 604/96.01, 103.01, 604/264, 540

See application file for complete search history.

(56) References Cited

U.S. PATENT DOCUMENTS

| | | | |
|---|---|---|---|
| 4,303,595 A | 12/1981 | Allen | 260/746 |
| 4,385,136 A | 5/1983 | Ancker et al. | 523/215 |
| 4,425,384 A * | 1/1984 | Brownscombe | 427/221 |
| 4,444,816 A | 4/1984 | Richards et al. | 428/36 |
| 4,810,734 A | 3/1989 | Kawasumi et al. | 523/216 |
| 4,889,885 A | 12/1989 | Usuki et al. | 524/445 |
| 5,385,776 A | 1/1995 | Maxfield et al. | 428/297 |
| 5,853,886 A | 12/1998 | Pinnavaia et al. | 428/403 |
| 5,993,415 A | 11/1999 | O'Neil et al. | 604/96 |
| 5,994,445 A | 11/1999 | Kaschel et al. | 524/444 |
| 6,034,163 A | 3/2000 | Barbee et al. | 524/445 |
| 6,136,908 A | 10/2000 | Liao et al. | 524/445 |
| 6,667,360 B1 * | 12/2003 | Ng et al. | 524/492 |
| 2003/0065355 A1 * | 4/2003 | Weber | 606/200 |
| 2003/0093107 A1 * | 5/2003 | Parsonage et al. | 606/194 |
| 2003/0099798 A1 * | 5/2003 | George et al. | 428/36.9 |
| 2003/0100656 A1 * | 5/2003 | Majumdar et al. | 524/445 |

FOREIGN PATENT DOCUMENTS

| | | |
|---|---|---|
| EP | 0352042 | 7/1989 |
| EP | 0358415 A1 | 9/1989 |
| EP | 0398551 A2 | 5/1990 |
| EP | 1038834 A1 | 9/2000 |
| JP | 02208358 A | 8/1990 |
| WO | WO 93/11190 | 6/1993 |
| WO | WO 99/07790 * | 2/1999 |
| WO | WO 01/34685 | 5/2001 |

* cited by examiner

*Primary Examiner*—Susan Berman
(74) *Attorney, Agent, or Firm*—Grossman, Tucker, Perreault & Pfleger, PLLC

(57) ABSTRACT

A polymer composite composing a polymer matrix having, dispersed therein, a nano clay in combination with a crosslinking promotor. In method form, the invention relates to a process for enhancing the mechanical properties of a polymer composite, comprising supplying a polymer matrix, combining the matrix with a nano clay and a crosslinking promotor and crosslinking.

8 Claims, No Drawings

OPTIMIZING NANO-FILLER PERFORMANCE IN POLYMERS

This application is a continuation of U.S. patent application Ser. No. 10/129,921, filed Feb. 5, 2003 now U.S. Pat. No. 6,833,392, which claims the benefit of international application No. PCT/US00/31174 filed Nov. 13, 2000 (WO 01/34685), which claims the benefit of U.S. provisional patent application Ser. No. 60/164,589, filed on Nov. 10, 1999, the entire disclosures of all of which are herein incorporated by reference.

The present invention relates to nano clays for use in thermoplastic/thermoset polymer materials, wherein the nano clay may be combined with another chemical ingredient, such as a crosslinking agent, to thereby provide a unique and overall synergistic effect on mechanical property performance.

Polymer composites comprising a polymer matrix having one or more additives such as a particulate or fiber material dispersed throughout the continuous polymer matrix are well known. The additive is often added to enhance one or more properties of the polymer. Useful additives include inorganic layered materials such as talc, clays and mica of micron size.

A number of techniques have been described for dispersing the inorganic layered material into a polymer matrix. It has been suggested to disperse individual layers, e.g., platelets, of the layered inorganic material, throughout the polymer. However, without some additional treatment, the polymer will not infiltrate into the space between the layers of the additive sufficiently and the layers of the layered inorganic material will not be sufficiently uniformly dispersed in the polymer.

To provide a more uniform dispersion, as described in U.S. Pat. No. 4,889,895 sodium or potassium ions normally present in natural forms of mica-type silicates and other multilayered particulate materials are exchanged with organic cations (e.g., alkylammonium ions or suitably functionalized organosilanes) thereby intercalating the individual layers of the multilayered materials, generally by ionic exchange of sodium or potassium ions. This intercalation can render the normally hydrophilic mica-type silicates organophilic and expand its interlayer distance. Subsequently, the layered material (conventionally referred to as "nanofillers") is mixed with a monomer and/or oligomer of the polymer and the monomer or oligomer polymerized. The intercalated silicate is described as having a layer thickness of 7 to 12 [Angstrom] and an interlayer distance of 30 [Angstrom] or above.

In WO 93/11190, an alternative method for forming a composite is described in which an intercalated layered, particulate material having reactive organosilane compounds is dispersed in a thermoplastic polymer or vulcanizable rubber. Yet additional composites containing these so-called nanofilers and/or their methods of preparation are described in U.S. Pat. Nos. 4,739,007; 4,618,528; 4,528,235; 4,874,728; 4,889,885; 4,810,734; 4,889,885; 4,810,734, and 5,385,776; German Patent 3808623; Japanese Patent J02208358; European Patent applications 0,398,551; 0,358,415; 0,352,042; and 0,398,551; and J. Inclusion Phenomena 5, 473 (1987); Clay Minerals, 23, (1988), 27; Polym. Preprints, 32 (April 1991), 65–66; Polym. Prints, 28, (August 1987), 447–448; and Japan Kokai 76,109,998.

Nano clay fillers are also available based on tiny platelets of a special type of surface modified clay called montmorillonite. These surface treatments have been aimed for use with nylon-6 and polypropylene. The two manufacturers in the United States, Nanocor and Southern Clay Products, both point to increases in flexural modulus, heat distortion temperature and barrier properties.

Furthermore, attention is hereby directed to U.S. Pat. Nos. 5,993,415 and 5,998,551 which, although not relating to nano clay fillers, describe the use of crosslinking promotors to improve properties of a thermoplastic material, and, as to be discussed below, are relevant to the present invention. Accordingly, the teachings of these patents are incorporated by reference.

In sum, therefore, even with the numerous described composites and methods, it still remains desirable to have an improved composite and method for forming polymer composites derived from a multilayered additive (nano clays) to thereby create composites having improved properties over the polymer on its own.

Accordingly, it is an object of this invention to explore the suitability of combining the nano clays with an additional chemical component to establish whether or not the observed mechanical properties of a thermoplastic host resin are improved beyond the use of only a nano day filler.

More specifically, it is an object of this invention to combine nano clays with a suitable crosslinking promotor, and to establish a synergistic effect of such promoters with the nano clay on the mechanical properties of a host thermoplastic matrix.

In addition, it is an object of this invention to apply the nano clays and additional chemical component described above (promotor) to develop an improved method to prepare materials suitable for use in medical product applications, such as balloon catheters and catheter shaft production.

By way of summary, the present invention comprises a composite comprising a polymer matrix having, dispersed therein, a nano clay in combination with a crosslinking promotor. By use of the term "nano clay" it is noted that such clays are inorganic minerals which have a high aspect ratio with at least one dimension of the particles therein in the nanometer range. By use of the term, "crosslinking promotor" it relates to any chemical compound that will promote crosslinking between those polymer chains that comprise the polymer matrix. Accordingly, it can be appreciate that "crosslinking promotors" include those functionalized chemical compounds that provide the requisite activity, upon activation (irradiation or heat) to chemical react and bond with the polymer chains to form covalent crosslinks between the surrounding polymer chains.

Preferably, the crosslinking promotor is trallylisocyanurate or trallylcyanurate, although those skilled in the art will recognize that other types of crosslinking promotors would be suitable and would fall within the broad aspects of this invention. In addition, preferably, the promotor is present in the polymer matrix at a level of about 0.5% to 10% (wt.), and at any increment therebetween in 0.1% increments.

As noted, the nano clays are inorganic minerals with a high aspect ratio as one dimension of the particles therein falls in the nanometer range. A variety of references are available to those skilled in the art which discuss and describe nano clays suitable herein. In such regard, the clays having a plate structure and thickness of less than one nanometer are the clays of choice. The length and width of the clays may fall in the micron range. Aspect ratios of the preferred clays are in the 300:1 to 1,500:1 range. In addition, the surface area of the exfoliated clays is preferably in the range of 700 $m^2$/gram. Nano clays that may be suitable herein include hydrotalcite, montmorillonite, mica fluoride, octasilicate, and mixtures thereof. Nano clay is incorporated herein at a level of 1–10% (wt.) as well as any increment therebetween, in 0.1% increments.

Montmorillonite nano clays have a plate like structure with a unit thickness of one nanometer or less. This clay also has an aspect ratio in the 1000:1 range. Because montmorillonite clay is hydrophilic, it is not compatible with most polymers and should be chemically modified to make its surface more hydrophobic. The most widely used surface treatments are amonium cations which can be exchanged for existing cations already on the surface of the clay. The treated clay is then preferably incorporated into the polymer matrix herein, by melt mixing by extrusion, more preferably, twin-screw extrusion. In addition, at such time, and as noted above, the crosslinking promotor can also be readily combined with the clay during the melt mixing process. Those skilled in the art will therefore recognize that, in general, any type of melt mixing process can be applied to prepare the composites of the present invention, including extrusion, direct injection molding, the use of a two-roll mill, etc.

With regards to the development of crosslinking herein, as noted, a crosslinking promotor is employed, and preferably, the formulations herein are exposed to irradiation. Preferably, the irradiation dosage is between about 1–20 MR as well as any numerical value and/or increment therein.

In addition, the polymer matrix herein may be selected from any thermoplastic or thermoset type polymer resin host. A representative thermoplastic resin herein is a nylon resin, a nylon block copolymer, nylon block copolymers containing a polyamide block and an elastomeric block, engineering thermoplastic resins (e.g., polycarbonate, polyesters, polysulphones, polyketones, polyetherimides) as well as commodity type materials (polyethylene, polypropylene, polystyrene, poly(vinylchloride)) including thermoplastic elastomers. Representative thermoset materials include polyurethanes, epoxy polymers, etc.

In method form, the present invention relates to the steps of supplying a polymer matrix, combining said matrix with a nano clay along with a crosslinking promotor. This combination is then preferably exposed to irradiation to develop crosslinking. By the practice of such method, and as can be observed in the various working examples below, a synergistic influence of the promotor has been observed on the ability of the nano clay to improve the mechanical properties of a given polymer matrix. More specifically, in accordance with the invention herein it has been found that should one combine a given polymer matrix with the nano clay, one will generally observe an increase in mechanical property performance, such as an increase in the flexural modulus. However, it has been found herein that upon incorporation of a crosslinking promotor, the effect of the nano clay is enhanced, in the sense that a synergy is observed as between the promotor and the nano clay on mechanical properties.

As a consequence of all the above, the formulations of the present invention are particularly suitable for the development of an intravascular catheter having a tubular shaft comprising a nylon block copolymer and a nano clay filler, including a compound which promotes crosslinking therein, and a soft flexible tubular tip distal of and bonded to said shaft, the improvement comprising irradiation crossing said nylon block copolymer of said tubular shaft. The crosslinking is observed to increase the rigidity of the shaft relative to the soft distal tip.

In addition, the present invention also relates to a balloon type catheter having a tubular shaft comprising a nylon block copolymer and a nano clay filler, including a compound which promotes crosslinking therein, the improvement comprising irradiation crosslinking said nylon block copolymer of the balloon section.

WORKING EXAMPLES

First Experiment

The first experiment consisted of mixing the Nanocor 130 TGC clay and the southern Clay Closite 30B with Nylon 6 and with Nylon 6 and 3% TAIC. The Nylon 6 used with Allied's Capron B135 WP.

The flex modulus did increase with the use of both clays as was anticipated. The increase with the use of a crosslinking promotor was even greater, demonstrating a unique synergy as between the promotor and the nanoclay on mechanical properties. See Table I.

Second Experiment

The second experiment repeated the first experiment except that the Nylon 6 was replaced by PEBAX® 72 durometer polyamide ether block copolymer. In this case just adding the nano clay did not significantly increase the flex modulus. The surprise was the increase in flex modulus when crosslinking promoters, such as TAIC, was added to the PEBAX® and nano clay. The closite 30B shows the most improvement. A second unqiue effect was the increase in flex modulus when the combination was crosslinked. In fact the combination of PEBAX®, Cosite (nano clay) and TAIC followed by crosslinking more than doubles the flex modulus. See Table II.

Third Experiment

The third experiment was similar to the first experiment noted above except the nylon-6 was replaced by nylon 12, AESNO® from Atcochem. The improvements in flex modulus were much like the improvements with the PEBAX® in "Experiment Two", noted above. See Table III.

Fourth Experiment

The fourth experiment was similar to the third experiment noted above, except that nylon-12 was replaced by nylon-11, BMNO® from Atcohem. The improvements in flex modulus were much like the improvements with the PEBAX® in "Experiment Two". See Table IV.

Fifth Experiment

The fifth experiment was similar to the above, except that both low density and high density polyethylene were employed s the polymer matrix. An improvement in flex modulus was again observed due to the combination of nano clay and promotor (3% wt. TAIC. See Table V.

TABLE I

NYLON 6

| POLYMER | FILLER | FORMULATION | FILLER % | IRA DOSE | BK-STRESS | % STRAIN | FLX-MOD |
|---|---|---|---|---|---|---|---|
| NYLON 6 | NONE | CAPRON B135W | 0 | 0MR | 9,500 | 150 | 350,000 |
| NYLON 6 | NANO-130TC | #2 | 5 | 0MR | 9,500 | 150 | 450,000 |
| NYLON 6 3% TAIC | NANO-130TC | 20C | 5 | 0MR | 6,200 | 75 | 410,000 |
| NYLON 6 3% TAIC | NANO-130TC | 29C | 5 | 5MR | 7,200 | 15 | 530,000 |
| NYLON 6 3% TAIC | NANO-130TC | 29C | 5 | 10MR | 9,500 | 15 | 550,000 |
| NYLON 6 | CLOSITE 30B | 29I | 5 | 0MR | 9,400 | 140 | 510,000 |
| NYLON 6 3% TAIC | CLOSITE 30B | 29B | 5 | 0MR | 13,250 | 190 | 430,000 |
| NYLON 6 3% TAIC | CLOSITE 30B | 29B | 5 | 5MR | 10,300 | 25 | 550,000 |
| NYLON 6 3% TAIC | CLOSITE 30B | 29B | 6 | 10MR | 10,100 | 25 | 590,000 |
| NYLON 6 3% TAIC | NONE | #1 | 0 | 5MR | 9,500 | 50 | 380,000 |

TABLE II

PEBAX 7233

| POLYMER | FILLER | FORMULATION | FILLER % | IRA DOSE | BK-STRESS | % STRAIN | FLX-MOD |
|---|---|---|---|---|---|---|---|
| PEBAX | NONE | PEBAX 7233 | 0 | 0MR | 8,000 | 250 | 105,000 |
| PEBAX | CLOSITE 30B | 29E | 5 | 0MR | 7,600 | 200 | 135,000 |
| PEBAX 3% TAIC | CLOSITE 30B | 28A | 5 | 0MR | 6,500 | 180 | 160,000 |
| PEBAX 3% TAIC | CLOSITE 30B | 28A | 5 | 5MR | 6,500 | 75 | 260,000 |
| PEBAX 3% TAIC | CLOSITE 30B | 28A | 5 | 10MR | 6,500 | 50 | 275,000 |
| PEBAX 3% TAIC | NANO-130TC | 28D | 5 | 0MR | 9,200 | 300 | 135,000 |
| PEBAX 3% TAIC | NANO-130TC | 28D | 5 | 5MR | 8,200 | 150 | 200,000 |
| PEBAX 3% TAIC | NANO-130TC | 28D | 5 | 10MR | 7,800 | 125 | 210,000 |
| PEBAX 3% TAIC | NONE | 28E | 0 | 5MR | 7,900 | 150 | 150,000 |

TABLE III

NANO'S WITH XL-NYLON
NYLON 12

| POLYMER | FILLER | FORMULATION | FILLER % | IRA DOSE | BK-STRESS | % STRAIN | FLX-MOD |
|---|---|---|---|---|---|---|---|
| NYLON 12 | NONE | AESNO | 0 | 0MR | 10,000 | 250 | 200,000 |
| NYLON 12 | CLOSITE 30B | 29A | 5 | 0MR | 9,000 | 200 | 200,000 |
| NYLON 12 3% TAIC | CLOSITE 30B | 28B | 5 | 0MR | 10,750 | 175 | 290,000 |
| NYLON 12 3% TAIC | CLOSITE 30B | 28B | 5 | 5MR | 10,250 | 75 | 410,000 |
| NYLON 12 3% TAIC | CLOSITE 30B | 28B | 5 | 10MR | 10,100 | 50 | 420,000 |
| NYLON 12 | NANO-130TC | #8 | 5 | 0MR | 9,000 | 200 | 190,000 |
| NYLON 12 3% TAIC | NANO-130TC | 29D | 5 | 0MR | 10,200 | 300 | 200,000 |
| NYLON 12 3% TAIC | NANO-130TC | 29D | 5 | 5MR | 9,500 | 130 | 260,000 |
| NYLON 12 3% TAIC | NANO-130TC | 29D | 5 | 10MR | 9,600 | 125 | 260,000 |
| NYLON 12 3% TAIC | NONE | 29F | 0 | 5MR | 8,000 | 75 | 220,000 |

TABLE IV

NANO'S WITH XL-NYLON
NYLON 11

| POLYMER | FILLER | FORMULATION | FILLER % | IRA DOSE | BK-STRESS | % STRAIN | FLX-MOD |
|---|---|---|---|---|---|---|---|
| NYLON 11 | NONE | BMNO | 0 | 0MR | 10,000 | 250 | 170,000 |
| NYLON 11 3% TAIC | CLOSITE 30B | 28C | 5 | 0MR | 9,400 | 200 | 250,000 |
| NYLON 11 3% TAIC | CLOSITE 30B | 28C | 5 | 5MR | 9,000 | 125 | 300,000 |
| NYLON 11 3% TAIC | CLOSITE 30B | 28C | 5 | 10MR | 8,500 | 75 | 350,000 |

TABLE V

NANO CLAY IN HDPE & LDPE

| POLYMER | FILLER | FORMULATION | FILLER % | IRA DOSE | BK-STRESS | % STRAIN | FLX-MOD | FLX-MOD % INC |
|---|---|---|---|---|---|---|---|---|
| HDPE | NONE | 3364 | 0 | 0MR | 2,317 | 47 | 73,602 | 0 |
| HDPE | CLOSITE 30B | 30A | 6 | 0MR | 2,231 | 48 | 81,560 | 10.8 |
| HDPE | CLOSITE 30B | 30A | 6 | 5MR | 1,734 | 32 | 94,853 | 28.9 |
| HDPE | CLOSITE 30B | 30A | 6 | 10MR | 2,474 | 29 | 105,069 | 42.8 |
| HDPE | CLOSITE 30B | 30A | 6 | 15MR | 2,866 | 28 | 111,026 | 50.8 |
| HDPE | CLOSITE 30B | 30A | 6 | 20MR | 3,160 | 28 | 113,733 | 54.5 |

TABLE V-continued

NANO CLAY IN HDPE & LDPE

| POLYMER | FILLER | FORMULATION | FILLER % | IRA DOSE | BK-STRESS | % STRAIN | FLX-MOD | FLX-MOD % INC |
|---|---|---|---|---|---|---|---|---|
| LDPE | NONE | 6005 | 0 | 0MR | 1,016 | 49 | 21,295 | 0 |
| LDPE | CLOSITE 30B | 30B | 6 | 0MR | 1,000 | 48 | 25,856 | 21.4 |
| LDPE | CLOSITE 30B | 30B | 6 | 5MR | 1,434 | 33 | 29,339 | 37.8 |
| LDPE | CLOSITE 30B | 30B | 6 | 10MR | 1,890 | 35 | 31,987 | 50.2 |
| LDPE | CLOSITE 30B | 30B | 6 | 15MR | 2085 | 38 | 31,688 | 48.8 |
| LDPE | CLOSITE 30B | 30B | 6 | 20MR | 2,034 | 30 | 32,864 | 54.3 |

What is claimed is:

1. A polymer composite comprising a polymer matrix comprising a polyamide copolymer having a polyamide block and an elastomeric block having, dispersed therein, a nano clay in combination with a crosslinking promotor, said crosslinking promotor includes triallylisocyanurate or triallylcyanurate wherein said polyamide copolymer is crosslinked by said crosslinking promotor thereby improving the mechanical properties of said polymer composite.

2. The composite of claim 1 wherein said crosslinking promotor is present at a level of about 0.5 to 10% (wt).

3. The composite of claim 1 wherein said nano clay is present at a level of about 1 to 10% (wt).

4. The composite of claim 1 wherein said polyamide block is a nylon-6, nylon-6,6, nylon-11, nylon-12, copolymers of nylon-6/nylon-11, copolymers of nylon-6/nylon-12 or mixtures thereof.

5. The composite of claim 1 wherein said elastomeric block is selected from a polyether, polyester, hydrocarbon, polysiloxane or mixtures thereof.

6. A method for enhancing the mechanical properties of a polymer composite, comprising:
 (a) supplying a polymer matrix comprising a polyamide copolymer having a polyamide block and an elastomeric block;
 (b) combining said matrix with a nano clay and a crosslinking promotor, said crosslinking promotor includes triallylisocyanurate or triallylcyanurate wherein said polyamide copolymer is crosslinked by said crosslinking promotor thereby improving the mechanical properties of said polymer composite.

7. In an intravascular catheter having a tubular shaft comprising a nylon block copolymer and a soft flexible tubular tip distal of and bonded to said shaft, the improvement comprising adding a nano clay filler and a crosslinking promotor therein to said nylon block copolymer forming said shaft to form a copolymer composite, wherein said polyamide copolymer is crosslinked by said crosslinking promotor thereby improving the mechanical properties of said copolymer composite.

8. In a balloon type catheter having a tubular shaft comprising a nylon block copolymer and an integrally formed balloon section, the improvement comprising adding a nano clay filler and a crosslinking promotor therein to said nylon block copolymer forming said balloon to form a copolymer composite, wherein said polyamide copolymer is crosslinked by said crosslinking promotor thereby improving the mechanical properties of said copolymer composite.

* * * * *